United States Patent
Knjazihhin et al.

(10) Patent No.: US 8,752,137 B2
(45) Date of Patent: Jun. 10, 2014

(54) SECURITY CONTEXT PASSING FOR STATELESS SYSTEM MANAGEMENT

(75) Inventors: Denis Knjazihhin, Brighton, MA (US); Paul A. Reilly, Nashua, NH (US); Chet Birger, Lexington, MA (US); David Allen Solin, Austin, TX (US); Carl Adams, Albany, CA (US)

(73) Assignee: Bladelogic, Inc., Houston, TX (US)

( * ) Notice: Subject to any disclaimer, the term of this patent is extended or adjusted under 35 U.S.C. 154(b) by 531 days.

(21) Appl. No.: 12/790,426

(22) Filed: May 28, 2010

(65) Prior Publication Data

US 2011/0296499 A1    Dec. 1, 2011

(51) Int. Cl.
    *G06F 21/00*    (2013.01)

(52) U.S. Cl.
    USPC ............ 726/4; 726/1; 726/2; 726/12; 726/13; 726/14; 726/15; 726/16; 726/17; 726/26; 726/27; 726/28; 726/29; 726/30; 713/164; 713/165; 713/166; 713/167; 713/182; 713/183; 713/184; 713/185; 713/186

(58) Field of Classification Search
    USPC ................. 713/164–167, 182–186, 153–154; 726/1–6, 12–17, 26–30
    See application file for complete search history.

(56) References Cited

U.S. PATENT DOCUMENTS

| | | | |
|---|---|---|---|
| 2002/0095571 A1* | 7/2002 | Bradee | 713/164 |
| 2009/0007249 A1* | 1/2009 | Lu et al. | 726/9 |
| 2010/0095127 A1* | 4/2010 | Banerjee et al. | 713/179 |

* cited by examiner

*Primary Examiner* — Thanhnga B Truong
*Assistant Examiner* — Josnel Jeudy

(57) ABSTRACT

Systems and methods for stateless system management are described. Examples include a method wherein a user sends the management system a request to act upon a managed system. The management system determines whether the user is authorized for the requested action. Upon authorization, the management system looks up an automation principal, which is a security principal native to the managed system. The management system retrieves connecting credentials for the automation principal, and connects to the managed system using the retrieved credentials. Once the managed system is connected, the management system performs the requested action on the managed system, and sends the result back to the user.

16 Claims, 5 Drawing Sheets

SECURITY CONTEXT PASSING FOR STATELESS SYSTEM MANAGEMENT

BACKGROUND

This disclosure relates generally to the field of computer systems. More particularly, but not by way of limitation, it relates to a technique for improving configuration management systems.

In a large Information Technology (IT) environment with a wide variety of systems, configuration management software is typically used to manage complex IT data centers. The management software generally obtains information about the various systems present in the datacenter and initiates changes to configurations of these managed systems.

However, when managing multiple disjoint systems, it becomes difficult to define a coherent security context that spans heterogeneous computer systems in a complex data center. A common model is to deploy intelligence (via Agent software) on the managed systems that enforces access controls on the incoming requests. These models are inherently brittle because: (1) As new access control primitives are added on the managed system, they would need to be incorporated into the Agent software; (2) Sensitive access control information may need to be distributed to the managed systems, which increases the risk of a security compromise; and (3) Agent software often needs to run in the context of a highly privileged user such as "root" on UNIX systems and "SYSTEM" on Windows® systems, thereby exacerbating severities of security exploits. (WINDOWS is a registered trademark of the Microsoft Corporation.)

Thus, it would be beneficial to provide a mechanism that centrally manages connections to managed systems, and provides for stateless agents.

SUMMARY

Various embodiments disclose systems and methods that pass security context that is native to the managed systems to an agent, and allow a user the ability to define arbitrary associations with a managed system and browse the managed system in the security context native to the managed system.

In one embodiment, a method is disclosed to pass security context by a management system. The method comprises receiving a request from a user to act on a managed system; authorizing the requested action to access the managed system; retrieving an automation principal, wherein the automation principal is a native security principal of the managed system; connecting to the managed system using the automation principal's credential; executing the request action on the managed system; and returning a response to the user.

In another embodiment, a configuration management system is disclosed. The configuration management system comprises a processor; an operator display, coupled to the processor; a storage subsystem, coupled to the processor; and a software program, application or module stored in the storage subsystem, comprising instructions that when executed by the processor cause the processor to perform the method described above.

In yet another embodiment, a non-transitory computer readable medium is disclosed. The non-transitory computer readable medium has instructions for a programmable control device stored thereon wherein the instructions cause a programmable control device to perform the method described above.

In yet another embodiment, a networked computer system is disclosed. The networked computer system comprises a plurality of computers communicatively coupled, at least one of the plurality of computers programmed to perform at least a portion of the method described above wherein the entire method described above is performed collectively by the plurality of computers.

DETAILED DESCRIPTION

Figure 1:
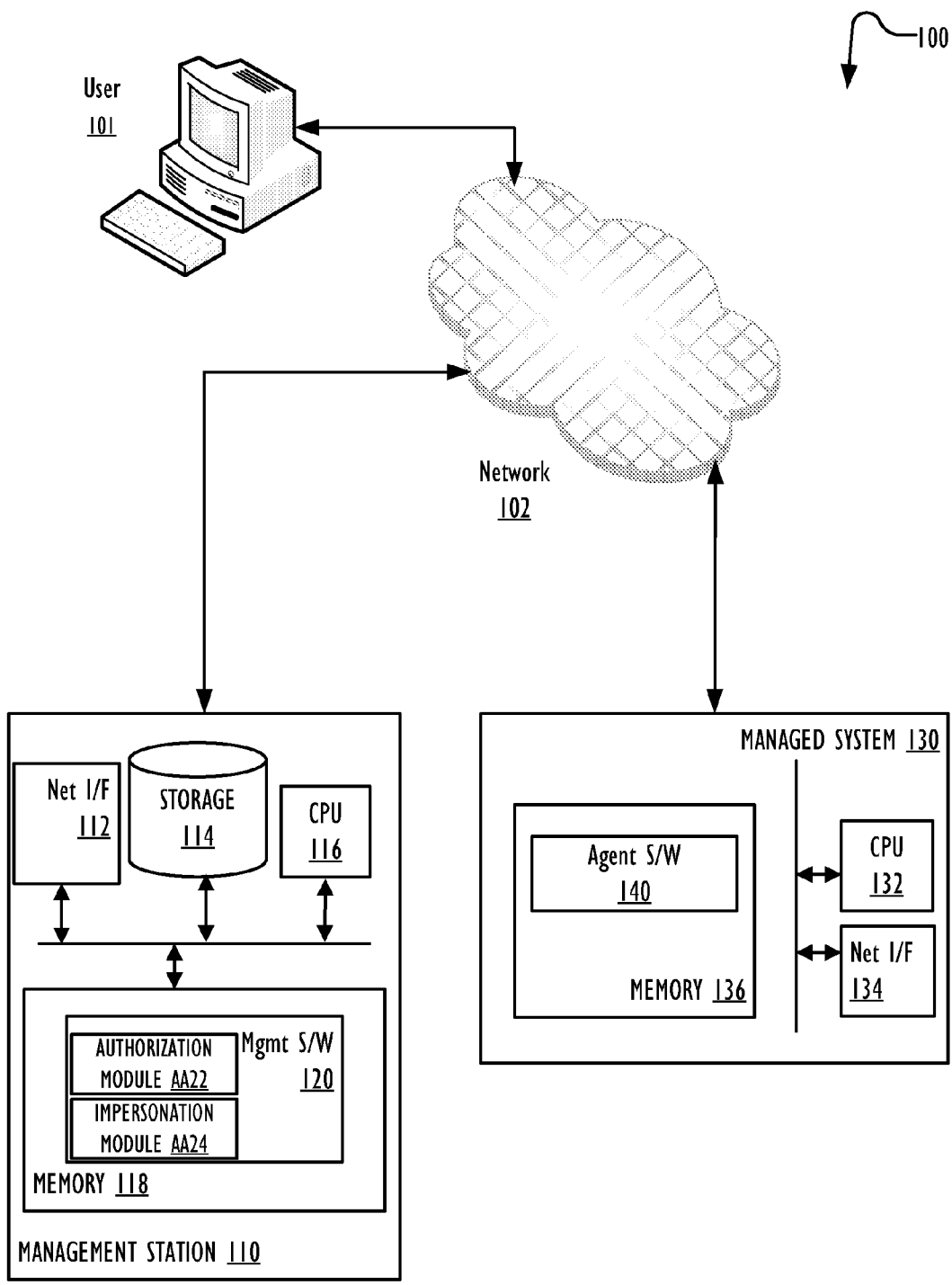
FIG. 1 illustrates an example system for security context passing.

Various embodiments disclose systems and methods that provide a user the ability to span managed systems through security contexts native to the managed systems. According to one embodiment, a user sends the configuration management system a request to act upon a managed system. The configuration management system determines whether the user is authorized for the requested action and, if the user action is authorized, the configuration management system looks up an automation principal, which is a security principal native to the managed system, based on the current security context of the user and the managed system. If an automation principal is found, the configuration management system retrieves associated credentials for the automation principal, and connects to the managed system using the automation principal and the retrieved credentials. Once the managed system is connected, the configuration management system performs the requested action on the managed system and sends the result back to the user.

In the following description, for purposes of explanation, numerous specific details are set forth in order to provide a thorough understanding of the invention. It will be apparent to one skilled in the art, however, that the invention may be practiced without these specific details. In other instances, structure and devices are shown in block diagram form in order to avoid obscuring the invention. It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the art having the benefit of this disclosure. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

In a large IT environment, there exist a wide variety of software units. A management software system is typically deployed to manage these heterogeneous software units. In this disclosure, the term "managed systems" is used to refer to coherent, well defined software units being administered by the management software. The configuration management system sometimes presents the managed systems to users in a graph representation. Each node in this graph representation denotes a managed system. A managed system is also called a node in this disclosure. Illustrative managed systems include, but are not limited to: system software (such as Linux), middleware (such as WebSphere) and distributed applications (such as Active Directory).

FIG. 1 illustrates example configuration management system 100 that incorporates elements that enable a configuration management station to pass security context in heterogeneous environments. System 100 includes management station 110 coupled to network 102, which provides connectivity between management station 110, one or more users 101 and one or more managed systems 130. Such connectivity is provided via each system's network interface (e.g., network interfaces 112 and 134). Although example system 100 shows only one managed system for simplicity purposes, any number of any of a wide variety of computer systems may be managed using the systems and methods described, including stand-alone computer systems, client computer systems and mainframe computer systems, just to name a few examples.

Example management station 110 may be implemented using any of a variety of known hardware platforms (e.g., Intel and Advanced Micro Devices processor-based personal computers) and known operating systems (e.g., Linux® and Microsoft Windows®). (LINUX is a registered trademark of Linus Torvalds. WINDOWS is a registered trademark of the Microsoft Corporation.) While such hardware platforms and operating systems may include many different constituent components or modules, only those components and/or modules that are relevant to the discussion of the configuration management system are shown in FIG. 1 and described herein. Example management station 110 includes management software 120, which is loaded into memory 118 and executed by CPU 116, and which provides at least some of the configuration management functionality described herein. Management station 110 also includes persistent storage device 114 (e.g., a hard disk drive), used to store configuration settings of management software 120, and automation principals for managed systems 130.

As shown in FIG. 1, management software 120 includes Authorization Module 122 and Impersonation Module 124. Authorization module 122 authorizes a request action from a user. Impersonation module 124 impersonates the connection to managed system 130 as one of the native security principals. The management software also stores relevant information, such as DNS name, for each managed system 130. The information for managed systems is stored in persistent storage device 114.

As with management station 110, managed systems 130 may also be implemented using any of a variety of known hardware platforms (e.g., Cell, PowerPC® and UltraSPARC® processor-based blade servers) and known operating systems (e.g., AIX®, HP-UX® and Linux®). (POWERPC and AIX are registered trademarks of the International Business Machine Corporation. ULTRASPARC is a registered trademark of SPARC International, Inc. HP-UX is a registered trademark of the Hewlett-Packard Development Company.) Example managed system 130 includes agent software 140, which is loaded into memory 136 and executed by CPU 132, and which also provides at least some of the configuration management functionality described herein. Agent software 140 receives, via network interface 134, a connection request from management station 110, connects management station 110 with managed system 130, and performs and/or manages the actions requested by management station 110 on managed system 130.

An automation principal in this disclosure refers generally to a security principal native to a managed system, but not necessarily to the management software. For example, "root" is a well known security principal in the Linux operating system, but may not be a valid principal in the management software system. In one embodiment, an automation principal is an abstract object that contains a subject identifier and an associated credential. One example credential is a conventional username/password combination. Another example credential for an automation principal is a Kerberos TGT or an X509 certificate with the corresponding private key.

In one embodiment, the configuration management system provides the ability to create an association between a user's security context, a managed system and an automation principal. Consequently, whenever a user attempts to access a managed system, the authorization module of the management software looks up the automation principal associated with the user's security context and the managed system. Once an automation principal is found, the impersonation module can establish a connection to the managed system in a security context native to that system.

In one embodiment, a role based access control model (RBAC) is used to manage the authorization process. A RBAC system allows access to be restricted to certain objects for certain roles (or users). For example, role "A" might be able to view asset "X", but not modify it. In one embodiment, a role definition is extended to associate the role with a set of automation principals, one for each managed system. For example, an "Admin" role may be associated with a "root" automation principal for a Linux host, and with a "domain administrator" automation principal for an Active Directory, etc. A user may be assigned one or more roles. When a user requests to act upon a managed system, the RBAC system determines whether there is an automation principal associated with the user's active role and the target managed system. If an associated automation principal is detected, the impersonation module of the management software retrieves the automation principal and its associated credential, connects to the managed system using that credential, and executes the requested action on the managed system in the context of the associated automation principal.

More example associations between roles and automation principals are described below. Example management software implements an RBAC based authorization system, and manages Linux and Windows servers. A RBAC system may define two roles: "UnixAdministrators" and "Auditors". These are the automation principals created for the managed systems: "Linux Wheel" for a user in the "wheel" group on Linux servers, "Linux User" for a user in the "users" group on Linux, and "Windows User" for a user in the "Domain Users" group on Windows. The "Auditors" role can be associated with "Linux User" for Linux servers and "Windows User" for Windows servers. The "UnixAdministrators" role can be associated with "Linux Wheel" for Linux servers and with no automation principal for Windows servers, implying the role will not be able to access Windows systems. When a user in the "Auditors" role attempts to view the file system of a managed system, the file system information is retrieved in the context of "Linux User" for Linux systems and "Windows User" for Windows systems.

In one embodiment, there is one role dedicated to configure the security subsystem. This role may create new roles which would be able to do the same. For simplicity purpose, we call this role "Security Administrator". In one embodiment, the "Security Administrator" role may be responsible for defining which users have access to the management systems, what roles these users are allowed to assume, what actions a given role is authorized to perform, etc. In another embodiment, the "Security Administrator" role may also be responsible for creating automation principals and associating them with users, roles, and managed systems, or all of the three. For example, the "Security Administrator" role may define that "UnixAdministrators" would impersonate "Linux Wheel" on Linux systems and nobody on Windows systems.

Figure 2:
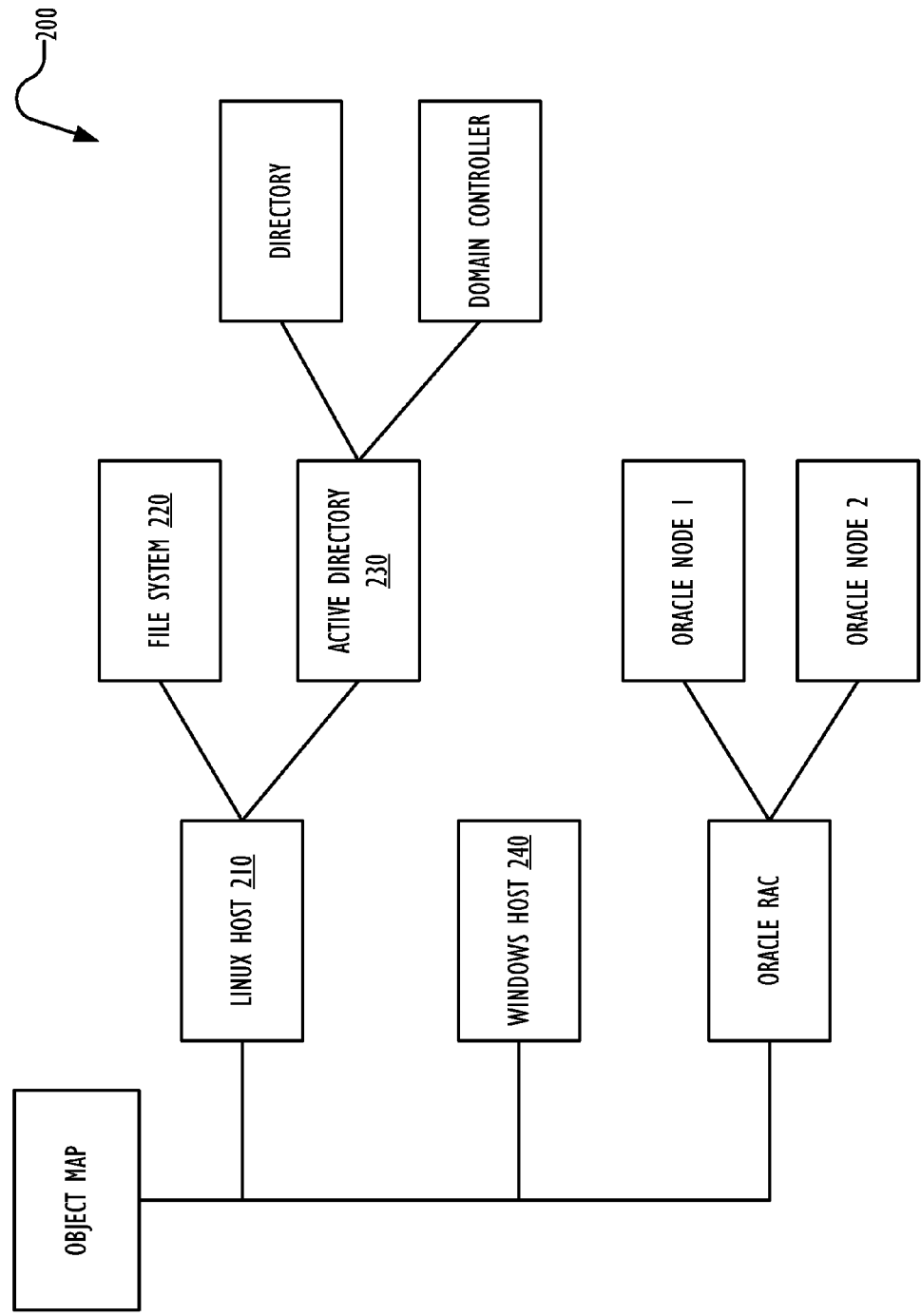
FIG. 2 illustrates, in graph form, an example of object graph according to one embodiment.

FIG. 2 illustrates an example graph 200 of managed systems (also called an object graph in this disclosure). These managed systems have natural and artificial interdependencies. An example natural dependency is node file system 220 of node Linux host 210, where file system 220 is a natural integral part of Linux host 210. An example artificial dependency is node Active Directory server 230 that is accessed through node Linux host 210. In one embodiment, each node (managed system) of the object graph is associated with an automation principal. For example, node Linux host 210 may be associated with the "root" automation principal and node Active Directory 230 attached to the Linux host may be associated with a "domain administrator" automation principal. When a user traverses the object graph to access individual nodes, the impersonation module of the management software assumes the identity of a principal native to the managed system. In one embodiment, each node of the object graph may be in either expanded or collapsed mode. When a user traverses the object graph to access a node, the user may expand the node to browse the subnodes. The user may impersonate different security principals when accessing each of the subnodes. For example, when a user expands Linux host 210, he may be impersonating the native root account, as he continues to drill down into the Active Directory node 230, the impersonated account switches to a domain administrator.

Referring again to FIG. 1, agent software 140 is running on each managed system 130. Agent software 140 communicates with the management software 120 on management station 110. In one embodiment, an Agent receives a connection request from the management station, along with a credential. The Agent connects the management station with the managed system using the credential received. Once a connection is established, the management software sends a request action to the Agent. The Agent then executes the requested action on the managed system in the security context of the automation principal.

Figure 3:
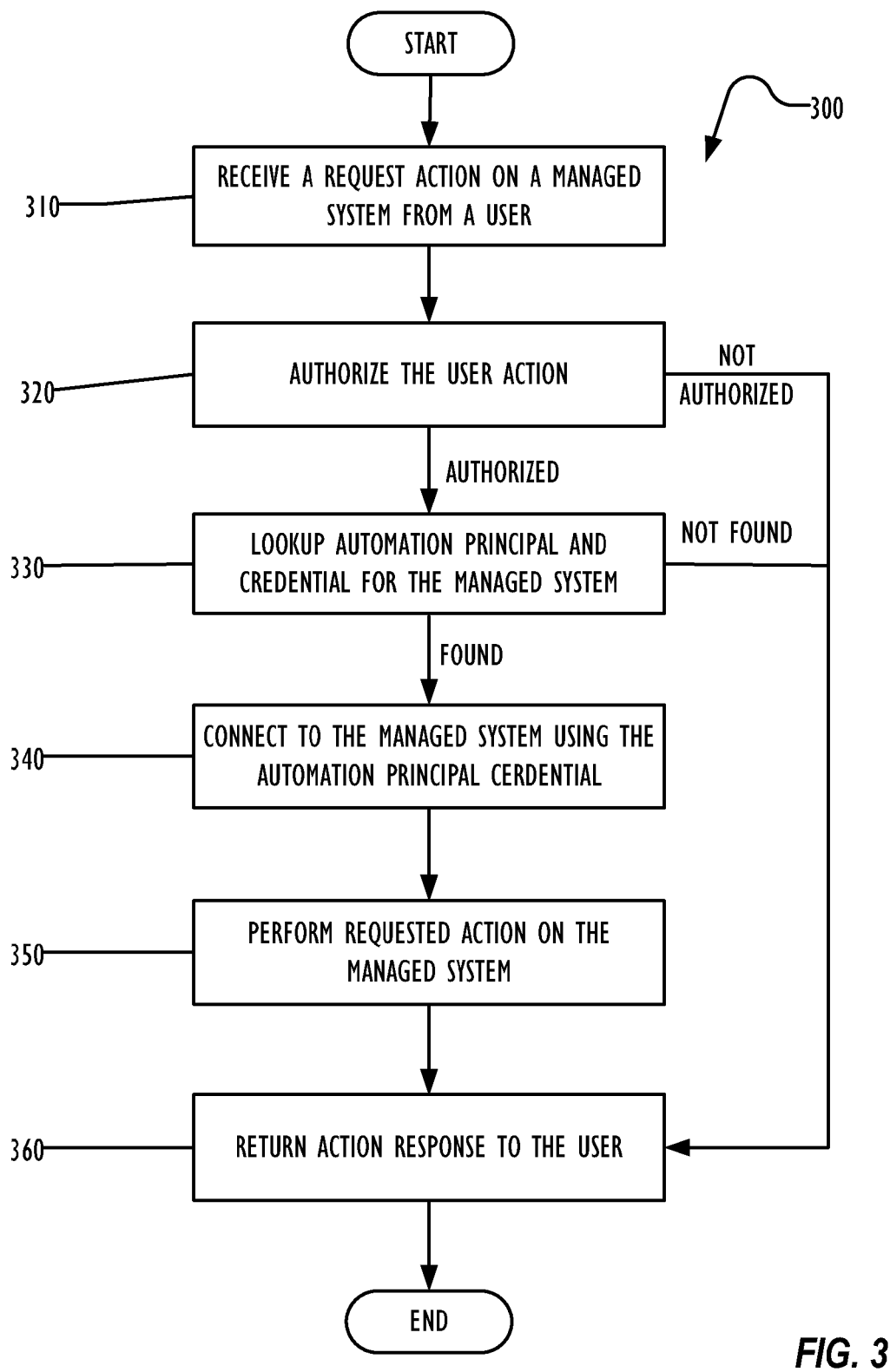
FIG. 3 illustrates, in flowchart form, a method for handling a user request action according to one embodiment.

FIG. 3 illustrates one embodiment of a method 300 for a configuration management system to process a request action from a user. At block 310, the configuration management system receives an action request, from a user, to access a managed system. Illustrative request actions include, but are not limited to, viewing a file under the "/" directory on Linux host 210 and deploying an application on Windows host 240, etc. In one embodiment, a user is provided with an interface to interact with the configuration management system. When a user requests to act on a target node, the request is sent to the configuration management system.

Once the management system receives the request action from the user, the authorization module of the management software determines whether the requested user action is authorized, block 320. In one implementation, an access control system such as role based access control (RBAC) is used to manage the authorization process.

The access control system allows access to be restricted to certain managed systems for certain roles. Roles of the configuration management system are authorized to enact a restricted set of actions on these managed systems. For example, an "LinuxAdmin" role of the management system may have the privilege to view the file system of a Linux host or deploy a Java application to a WebSphere Application Server. Another exemplary role of the management system is "Windows User", which allows the user to perform tasks on a target managed system as a regular Windows user would do. If the requested action falls outside the allowed privilege of the user's current active role, the management system terminates the request and sends an error message to the user informing the user that the requested action is not authorized, as shown in the "Not Authorized" prong of block 320. For example, a user assumes an active role of "LinuxAdmin", and requests to access a Windows host, the access control system will determine that the user does not have privilege to access the target Windows host.

If the user's request action is authorized, the impersonation module of the management system looks for an automation principal for the managed system, block 330. If no automation principal is found for the target managed system, the management system will terminate the requested action, and send an error message to the user informing the user that the requested action is not authorized, as shown in the "Not Found" prong of 330. In one embodiment, the management system also sends a response back to the user that no automation principal could be found to perform the requested action. If the impersonation module finds an automation principal for the target managed system, it retrieves the corresponding credential associated with the automation principal. Illustrative steps for retrieving an automation principal and associated credential are laid out in process 400 in FIG. 4.

Figure 4:
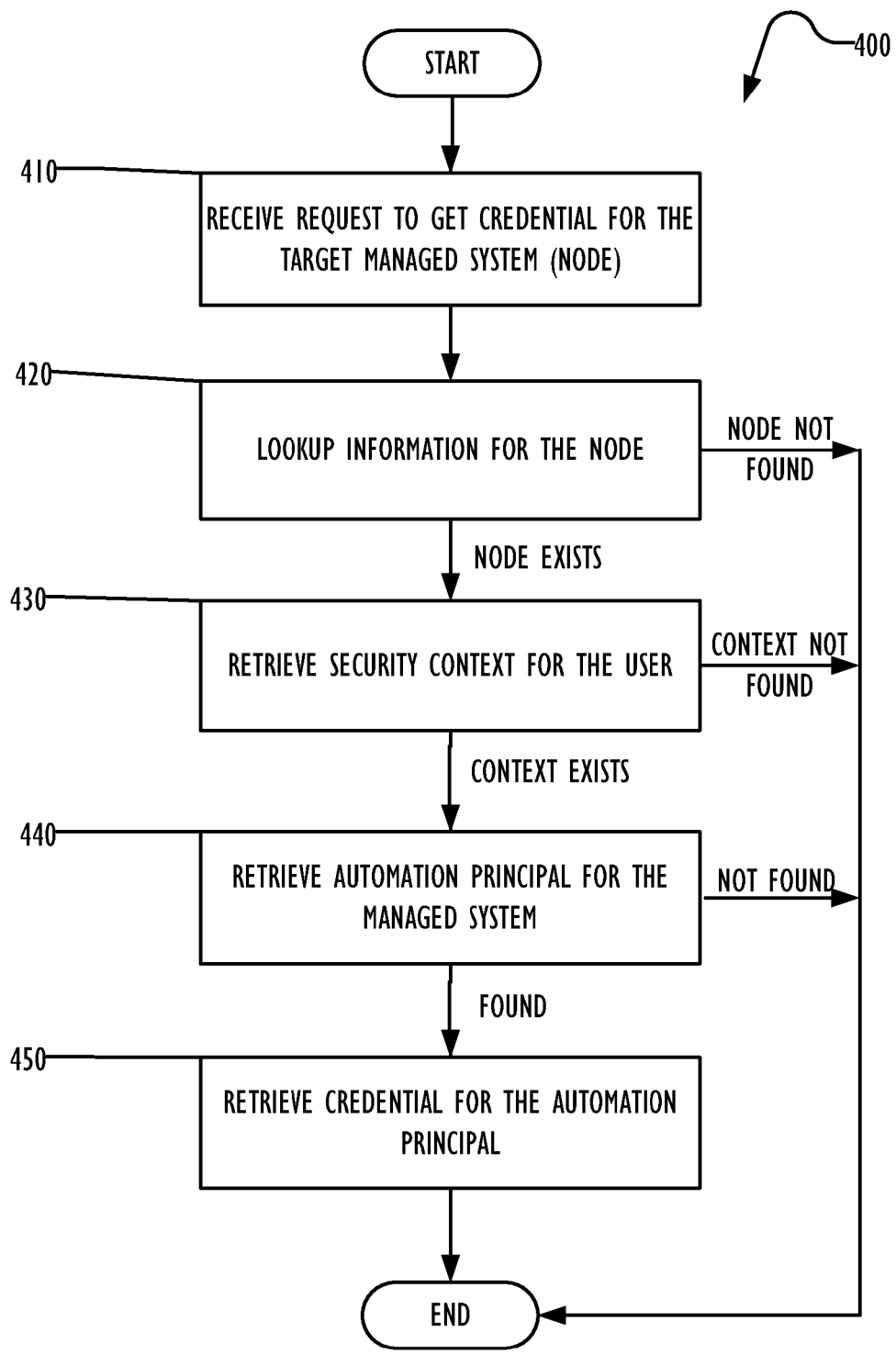
FIG. 4 illustrates, in flowchart form, a method for retrieving an automation principal and credential according to one embodiment.

As shown in FIG. 4, the impersonation module receives a request to retrieve impersonation credentials for the managed system, block 410. The impersonation module then searches for internal information about the target managed system (node) in its database, block 420. If the node does not exist in the database, the impersonation module terminates the process, and reports the error back to the management system, as shown in the "Node Not Found" prong of block 420. If the node exists, the impersonation module retrieves the current security context of the user, block 430. If the act of retrieving the current security context fails, the impersonation module terminates the process, and reports the error back to the management system as shown in the "Context Not Found" prong of block 430. After successful retrieval of the user's security context, the impersonation module determines an automation principal for the managed system, block 440. In one embodiment, the determination of an automation principal is based on both the user's current security context and the managed system that is being accessed. In another embodiment, the determination of an automation principal is based on the user's current security context, the managed system that is being accessed and the current time. If no automation principal is found for the managed system, the impersonation module terminates the process and reports the error to the management system as shown in the "Not Found" prong of block 440. After the impersonation module finds an automation principal, it retrieves the associated credentials for the automation principal, block 450.

Referring back to FIG. 3, after retrieving an automation principal and associated credentials for the managed system, the management system connects to the managed system, block 340. In one embodiment, the management system sends a connection request to an Agent software running on the managed system. The automation principal's credential is also passed to the Agent for the connection. The Agent software authenticates the connection request using the received automation principal's credential. If the connection request is authenticated, a connection between the management station and the managed system is established. The management system sends the request action to the Agent on the managed system. The Agent executes the requested action on the managed system, block 350. The response of the action is sent to the management station, and further sent to the user, block 360.

Figure 5:
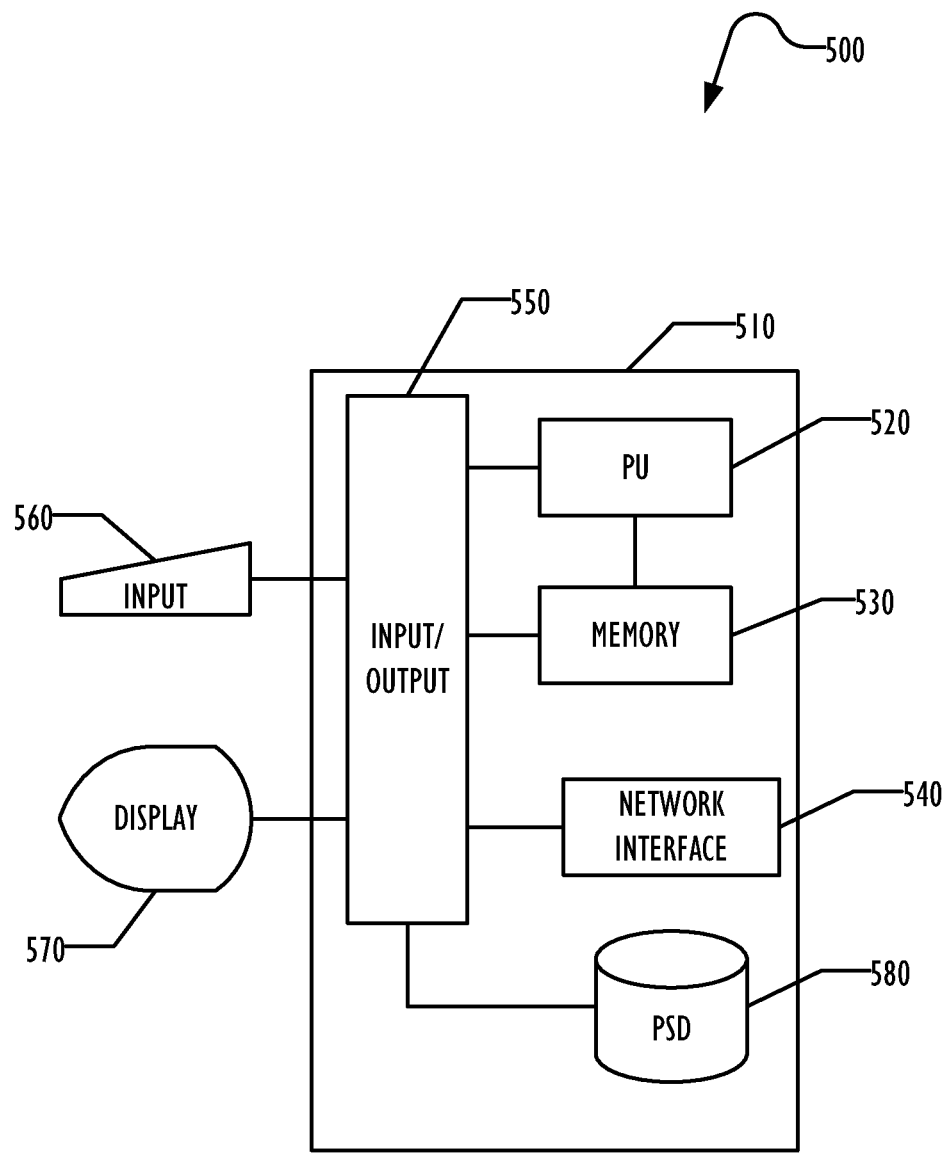
FIG. 5 illustrates, in block diagram form, an example computer system used for performing a technique for automatically adjusting baselines according to one embodiment.

Referring now to FIG. 5, example computer 500 is shown. Example computer system 500 may be used as a configuration management station (e.g., management station 110 of FIG. 1), and one or more example computer systems 500 may be used as managed systems 130 of FIG. 1). Example computer 500 comprises system unit 510 which may be optionally connected to input device 560 (e.g., keyboard, mouse, touch screen, etc.) and display 570. Program storage device (PSD) 580 is included with system unit 510. Also included within system unit 510 is network interface 540 for communication via a network with other computing and corporate infrastructure devices (not shown). Network interface 540 may be included within system unit 510 or be external to system unit 510. In either case, system unit 510 may be communicatively coupled to network interface 540. Program storage device 580 represents any form of non-volatile storage including, but not limited to, all forms of optical and magnetic storage, including solid-state, storage elements and removable media. Program storage device 580 may be used for storage of software to control system unit 510 in, data for use by the computer 500, or both.

System unit 510 may be programmed to perform methods in accordance with this disclosure (an example of which is shown in FIG. 3). System unit 510 comprises processor unit (PU) 520, input-output (I/O) interface 550 and memory 530. Processing unit 520 may include any programmable controller device including, for example, one or more members of the Intel Atom®, Core®, Pentium® and Celeron® processor families from Intel and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 530 may include one or more memory modules and comprise random access memory (RAM), read only memory (ROM), programmable read only memory (PROM), programmable read-write memory, and solid-state memory. One of ordinary skill in the art will also recognize that PU 520 may also include some internal memory including, for example, cache memory.

In addition, acts in accordance with the methods of FIGS. 3 and 5 may be performed by example computer system 500 including a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Various changes in the components as well as in the details of the illustrated operational method are possible without departing from the scope of the following claims. For example, the illustrative system of FIG. 5 may be comprised of more than one computer communicatively coupled via a communication network, wherein the computers may be mainframe computers, minicomputers, workstations or any combination of these. Further, monitored applications may execute on multiple hardware platforms. Such a network may be composed of one or more local area networks, one or more wide area networks, or a combination of local and wide-area networks. In addition, the networks may employ any desired communication protocol and further may be "wired" or "wireless." In addition, acts in accordance with FIG. 3 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for passing security context in an heterogeneous environment created by a plurality of diverse computer systems each having different respective native security principals, the method comprising;

implementing a centralized configuration management system by executing instructions on a central processing unit (CPU) coupled to a memory, the centralized configuration management system configured to manage the plurality of diverse computer systems each having different respective native security principals;

receiving a request at the centralized configuration management system, from a user for action on a particular managed computer system of the plurality of diverse computer systems each having different respective native security principals;

authorizing the user's access to the particular managed computer system of the plurality of diverse computer systems each having different respective native security principals based on the user's security context;

detecting whether there is an automation principal associated with the user and the particular managed computer system of the plurality of diverse computer systems each having different respective native security principals, wherein the automation principal is a native security principal of the particular managed computer system;

if no automation principal is found, reporting an error to the centralized configuration management system;
if an automation principal is found, retrieving the automation principal and a credential for the particular managed computer system;
connecting to the particular managed computer system using the automation principal and the credential;
executing the requested action on the particular managed computer system; and
returning a response to the user.

2. The method of claim 1, wherein retrieving an automation principal and credential comprises:
retrieving an access control model of the particular managed computer system;
determining an automation principal for the particular managed computer system based on its access control model;
retrieving the automation principal; and
retrieving a credential associated with the automation principal.

3. The method of claim 2, wherein determining an automation principal comprises:
retrieving a security context of the user; and
selecting, from a database, an automation principal based on the security context of the user and the access control model of the particular managed computer system.

4. The method of claim 3, wherein the security context of the user comprises one or more roles assigned to the user.

5. The method of claim 3, wherein the access control model of the particular managed computer system is a role-based access control model.

6. The method of claim 1, wherein authorizing the user's access to the particular managed computer system comprises determining, via an access control system, whether the user has access to the particular managed computer system.

7. The method of claim 6, wherein the access control system comprises a role based access control system.

8. The method of claim 7, wherein determining whether the user has access to the particular managed computer system comprises:
retrieving an active role of the user;
determining whether there is an automation principal for the particular managed computer system associated with the user's active role; and
signaling positive authorization if an association is found.

9. A computer system for managing one or more computer resources, comprising:
a processor;
an operator display coupled to the processor;
a storage subsystem coupled to the processor; and
a software module stored in the storage subsystem, the software module comprising instructions that when executed by the processor cause the processor to:
implement a centralized configuration management system to manage a plurality of diverse computer systems each having different respective native security principals;
receive a request at the centralized configuration management system, from a user for action on a particular managed computer system of the plurality of diverse computer systems each having different respective native security principals;
authorize the user's access to the particular managed computer system of the plurality of diverse computer systems each having different respective native security principals based on the user's security context;
detect whether there is an automation principal associated with the user and the particular managed computer system of the plurality of diverse computer systems each having different respective native security principals, wherein the automation principal is a native security principal of the particular managed computer system;
if no automation principal is found, report an error to the centralized configuration management system;
if an automation principal is found, retrieve the automation principal and a credential for the particular managed computer system;
connect to the particular managed computer system using the automation principal and the credential;
execute the requested action on the particular manacled computer system;
and
return a response to the user.

10. A programmable storage device having programmed instructions stored thereon for causing a programmable control device to:
implement a centralized configuration management system to manage a plurality of diverse computer systems each having different respective native security principals;
receive a request at the centralized configuration management system, from a user for action on a particular managed computer system of the plurality of diverse computer systems each having different respective native security principals;
authorize the user's access to the particular managed computer system of the plurality of diverse computer systems each having different respective native security principals based on the user's security context;
detect whether there is an automation principal associated with the user and the particular managed computer system of the plurality of diverse computer systems each having different respective native security principals, wherein the automation principal is a native security principal of the particular managed computer system;
if no automation principal is found, report an error to the centralized configuration management system;
if an automation principal is found, retrieve the automation principal and a credential for the particular managed computer system;
connect to the particular managed computer system using the automation principal and the credential;
execute the requested action on the particular managed computer system; and
return a response to the user.

11. The method of claim 1, wherein the automation principal is an abstract object that contains a subject identifier and an associated credential.

12. The method of claim 1, wherein the automation principal is a native security principal of the particular managed computer system but is not a security principal of the centralized configuration management system.

13. The method of claim 1, wherein the credential is a Kerberos TGT or an X509 certificate with a corresponding key.

14. The method of claim 1, wherein connecting to the particular managed computer system comprises:
sending a connection request from the centralized configuration management system to an agent running on the particular managed computer system;
passing the automation principal's credential to the agent running on the particular managed computer system; and authentication, by the agent, of the connection request using the received automation principal's credential.

15. The method of claim 14, wherein executing the requested action on the particular managed computer system comprises:
   sending the requested action from the centralized configuration management system to an agent running on the particular managed computer system; and
   executing the requested action, by the agent, on the particular managed computer system.

16. The method of claim 1, further comprising, providing a user with an interface to interact with the centralized configuration management system.

* * * * *